Inventors:
John R. Granan,
Ernest E. Lewis,
by Roe D. McBurnett
Their Attorney.

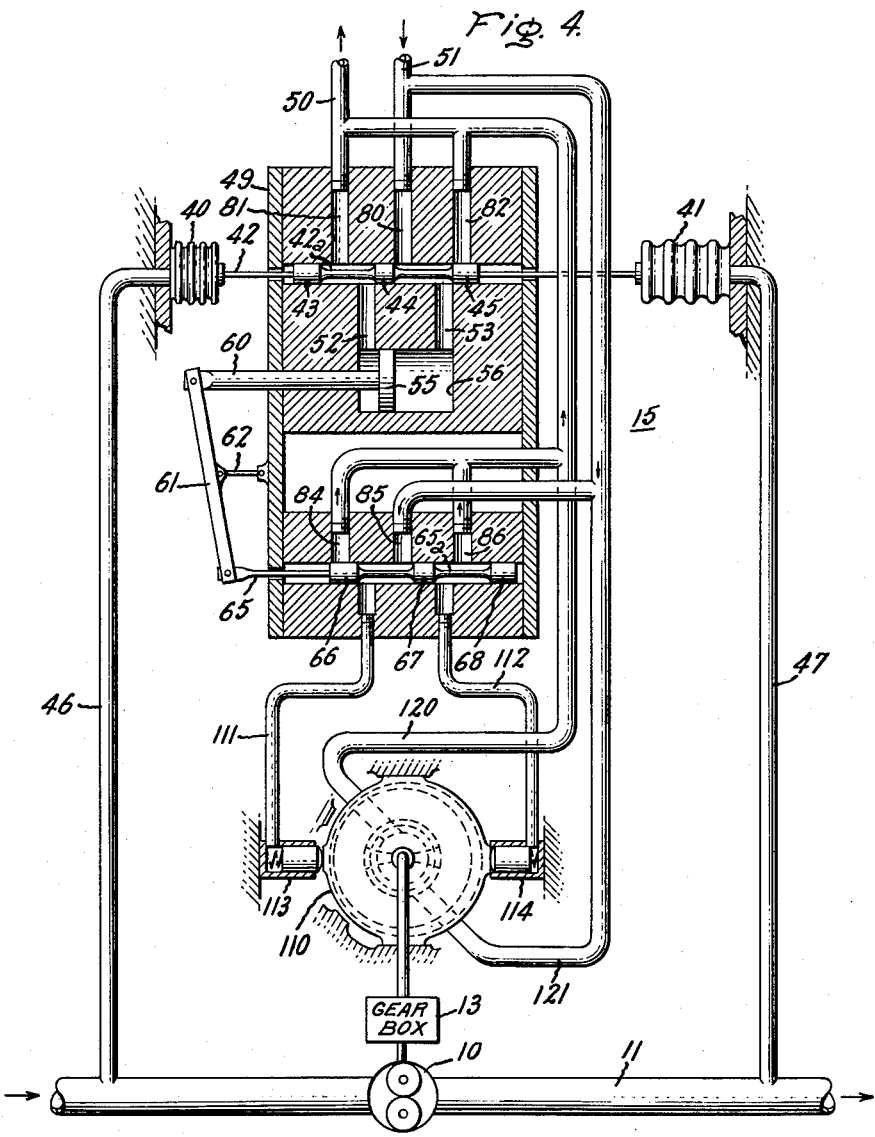

United States Patent Office 3,004,429
Patented Oct. 17, 1961

3,004,429
DYNAMIC FLOWMETER
John R. Granan and Ernest E. Lewis, Scotia, N.Y., assignors to General Electric Company, a corporation of New York
Filed Feb. 29, 1956, Ser. No. 568,586
6 Claims. (Cl. 73—232)

This invention relates to flowmeters and has for its object the provision of an accurate and reliable flowmeter for measuring fluid flow under conditions of variable temperature, pressure, and flow rate.

The problem of accurately and reliably measuring fluid flow under conditions of variable temperature, pressure, and flow rate is one that has received long and serious study by a host of investigators. The result of this study has been the development of a wide variety of flow measuring devices whose operating principles range from simple paddle wheels to Coriolis acceleration. Naturally, the efficiencies, accuracies, and complexities of these measuring devices cover an equally wide range.

In the development of hydraulic equipment for use in aircraft control systems the accurate determination of flow rates is a matter of prime importance. Unfortunately, the number and nature of the variables occurring during any single set of measurements is such as to preclude the use of currently available flowmeters. Present trends in hydraulics aim toward higher and higher pressures and operating temperatures. Concurrently, the development of hydraulic servo mechanisms capable of operation at relatively high frequencies requires a flowmeter which can follow the corresponding flow fluctuations without excessive time lag.

Thus, there is need for a flowmeter which will operate reliably and accurately over a wide range of pressures, temperatures, densities, and viscosities, and flow rates, and will be instantly cognizant of changes in flow rate. At the same time the flowmeter should not extract power from the fluid being metered.

Another object of this invention is to provide a flowmeter which will satisfactory fulfill the need for a flowmeter described in the preceding paragraph.

Briefly stated, in accordance with one aspect of this invention, there is provided a fixed displacement device adapted to be connected into a conduit through which fluid under pressure passes. Control means are provided for providing a signal in response to a pressure differential across the fixed displacement device and a driving mechanism responsive to this signal is provided for driving the fixed displacement device in a direction and at a speed tending to reduce the pressure differential to zero. Power for the control means and for the driving mechanism is obtained from a source independent of the fluid in the conduit. Indicating means are provided responsive to operation of the fixed displacement device driving mechanism for indicating flow through the conduit.

The invention will be better understood and additional advantages and objects thereof will become apparent upon perusal of the following specification and claims taken in connection with the drawings.

In the drawings,

FIGURE 4 is a view showing a flowmeter similar to that illustrated in FIGURE 1 but utilizing a different driving mechanism for the fixed displacement device.

FIGURE 5 is a view showing in more detail the pump driving mechanism of FIGURE 4.

Figure 1:
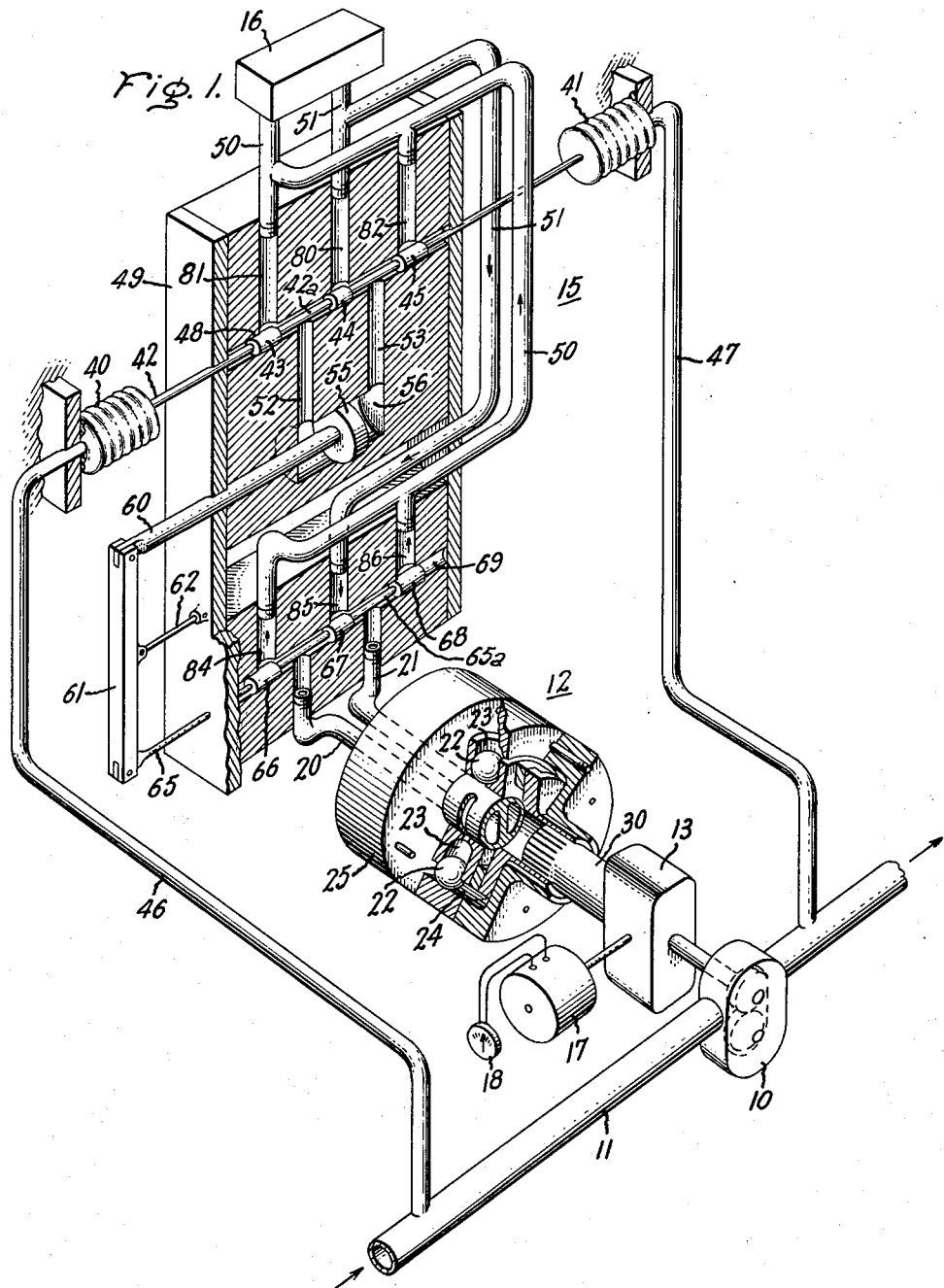
FIGURE 1 is a perspective view of a flowmeter illustrating the principles of this invention.

Referring more particularly to the drawings, in FIGURE 1 may be seen a fixed displacement device or pump 10 adapted for connection into a conduit 11 through which fluid under pressure passes. A driving mechanism is provided for driving the fixed displacement device, and an illustrative driving mechanism is indicated generally as a hydraulic motor 12 driving the fixed displacement pump 10 through a gearbox 13. A control means is provided for generating a signal and controlling the driving mechanism in response to a differential pressure across the pump 10, and in FIGURE 1 this means is in the form of a hydraulic control system. Power for the driving mechanism 12 and also for the control means is derived from a source independent of the conduit 11, as from a source of hydraulic fluid under pressure indicated generally at 16.

An indicating means responsive to operation of the fixed displacement device is provided; for example, tachometer 17 driven by the driving mechanism 12 and the associated voltage indicated 18, the voltage indicator giving an indication of flow through the conduit 11.

The hydraulic driving mechanism 12 is a ball piston type motor, and comprises a structure similar to that disclosed in the Rauch Patent 2,453,538. While the Rauch disclosure is used as a pump, the structure disclosed is also adapted for use as a motor such as that shown in FIGURE 1 of the present disclosure. Hydraulic fluid under pressure is received and discharged from the hydraulic ball pump motor 12 through conduits 20 and 21 depending on the direction of rotation called for by the control means 15. The pressure of the hydraulic fluid received in the motor 12 forces each ball piston 22 in turn radially outward in the cylinders 23 to act against the race 24 and cause rotation of the cylinder block 25 in a manner more fully described in connection with the above-mentioned patent. The motor drive shaft 30 is directly connected to the cylinder block 25 and rotates therewith to cause rotation of the gears in the gearbox 13 and operation of the fixed displacement device 10 and the tachometer 17.

As illustrated in FIGURE 1, the control means for the hydraulic motor 12 is in the form of a hydraulic servo loop. In this servo loop, opposed bellows 40 and 41 are connected by a rod 42 carrying a pilot valve 42a including valve lands 43, 44, and 45. Fluid pressure from the conduit 11 is admitted to the bellows 40 through a conduit 46, and to the bellows 41 through a conduit 47, the conduits 46 and 47 being connected to the conduit 11 on opposite sides of the fixed displacement pump 10, thus enabling the opposed bellows 40 and 41 to expand and contract in response to a differential pressure across the pump 10. The pilot valve 42a reciprocates within a cylinder 48 of a valve block 49 and serves to control the flow of fluid between fluid pressure supply conduit 51 and return conduit 50, and piston control conduits 52 and 53. A piston 55 is mounted for reciprocation within a cylinder 56 formed within the valve block 49. The piston 55 through connecting rod 60 and linkage 61, pivotally mounted to the valve block 49 as by a support rod 62, controls the position of a second stage valvle control rod 65. This control rod 65 carries second stage valve 65a including valve lands 66, 67, and 68 operating within a cylinder 69 formed within the valve block 49 to control fluid flow to and from the hydraulic motor conduits 20 and 21.

As has been pointed out above, power for the driving mechanism 12 and also for the control means 15 is obtained from a source independent of the fluid in the conduit 11, and as illustrated in FIGURE 1 this source is a source of fluid under pressure 16 connected to the conduits 50 and 51.

Operational

In operation the opposing bellows 40 and 41 are adjusted so that with zero flow in conduits 46 and 47 (that is, equal pressure on each bellows), the pilot valve 42a is in its neutral or centered position. In this position the pilot valve land 44 is located over the port 80 preventing flow from the inlet conduit 51 to either of the conduits 52 and 53. Also the lands 43 and 45 are closed over ports 81 and 82 preventing flow to the return conduit 50. If, now, the second stage valve 65a is also centered, the hydraulic motor 12 will be at rest. In this rest position, second stage valve 65a is closed preventing flow into or out of the conduits 84, 85, and 86 connected respectively to conduits 50 and 51.

As flow begins through the conduit 11, pressure in the bellows 40 will rise and the first stage pilot valve 42a will move to the right. Such movement will port hydraulic fluid from the port 80 into the conduit 52 to move the piston 55 to the right and to cause the linkage 61 to operate the second stage valve rod 65, moving it to the left. Movement of the second stage valve 65a to the left will port hydraulic fluid from the conduit 85 to the conduit 21 to energize the hydraulic motor 12 and to drive the fixed displacement pump 10, the direction of the driving of the pump being such as to reduce the differential pressure across it to substantially zero. Equalization of the pressure in the bellows 40 and 41 will recenter the pilot valve 42a. Since no feedback loop is provided between the first and second pilot valve stages, the second stage will remain open by an amount sufficient to produce the hydraulic motor speed which will maintain the pressure differential across the pump 10 at substantially zero.

The indicating means comprising the tachometer 17 and voltage indicator 18 will provide a reading proportional to the rate of flow through the conduit 11.

It should be pointed out that the linkage 61 between the piston 55 and the second stage valve is a gain reduction device desirable for stability purposes, but not necessary to the principle of operation of this invention. Also, it will be appreciated that by providing two or more gear shifting arrangements in the gearbox 13, a broader operating range of the indicating means may be obtained.

An important feature of this invention is that it makes possible the accurate and reliable measurement of fluid flow without utilizing energy from the fluid itself. This feature is realized by use of a separate power source for supplying power to the control means and to the driving mechanism for the fixed displacement pump.

Another feature of the invention is that a continuous flow measurement is provided and a switching or clutching mechanism is not required for starting the flowmeter in operation.

Another feature of the flowmeter of this invention is that it measures flow in either direction through the conduit 11, making unnecessary any changing of connections for reversal of flow.

Another advantage of this flowmeter is the wide range of flow measurements made possible by the motor control system utilized.

An additional feature of the invention is that the use of a control system separate from the fluid system in which flow is measured makes possible the measurement of corrosive fluid flow by the simple expedient of providing a corrosion resistant fixed displacement pump and corrosion resistant pressure differential detectors.

A high degree of accuracy is made possible by the principle of maintaining zero differential pressure across the fixed displacement device. Since there is no unmetered flow (leakage) across the unit, the product of pump displacement and speed is a true indication of flow.

The maintenance of a substantially zero pressure differential across the fixed displacement device assures a constant condition for measuring which eliminates recalibration with changes of pressure in conduits carrying the fluid to be metered.

Another feature of this flowmeter is its ability to measure volumetric fluid flow independent of pressure, viscosity, temperature, or fluid density.

That feature of this flowmeter which obviates the necessity for extracting power from the metered fluid eliminates undesirable fluid losses and, at the same time, prevents the generation of back pressures which could have undesirable effects on the operation of a fluid system or process.

Alternative embodiments

In the FIGURE 2 embodiment of the invention a hydraulic motor 12 drives a fixed displacement unit 10 through a gearbox 13 and indicating means 17 and 18 are provided as described in connection with the FIGURE 1 embodiment. The control means for the hydraulic motor 12 also comprises an arrangement similar to that disclosed in connection with FIGURE 1 in that a hydraulic valve arrangement controls fluid flow to the motor 12.

Figure 2:
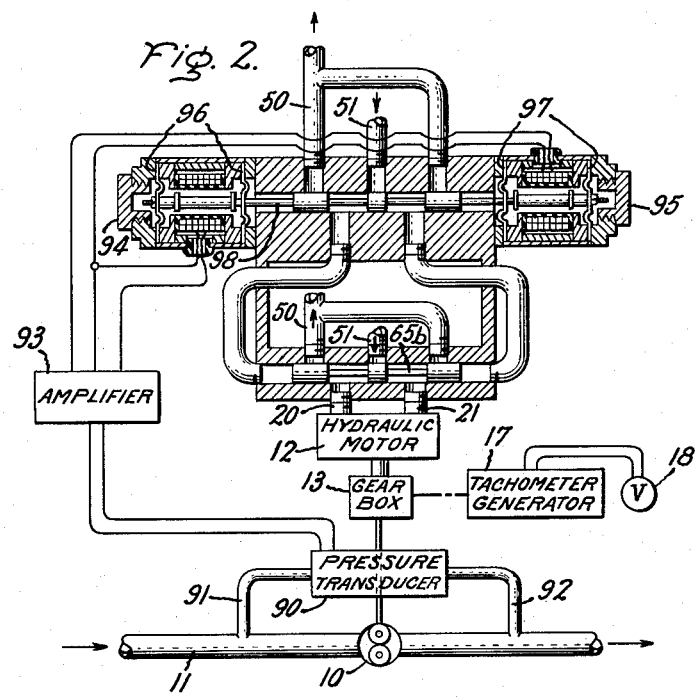
FIGURE 2 is a diagram partially schematic illustrating another embodiment of this invention.

The control means of FIGURE 2 differs from that shown in FIGURE 1 in that a pressure transducer 90 is connected across the fixed displacement pump 10 by conduits 91 and 92. This transducer 90 serves to generate an electrical signal of one polarity or another depending upon the pressure differential across the pump 10 and the conduit 11. The electrical signal output of the pressure transducer is amplified in an amplifier 93 and the resulting signal is applied to opposed solenoids 94 and 95. The solenoids 94 and 95 are spring centered by springs 96 and 97, and are electrically connected so that in response to signals of varying magnitude, they cause movement of the pilot valve rod 98 to control flow of hydraulic fluid to and from conduits 20 and 21 through a second stage valve 65b in turn connected to conduits 50 and 51.

Figure 3:
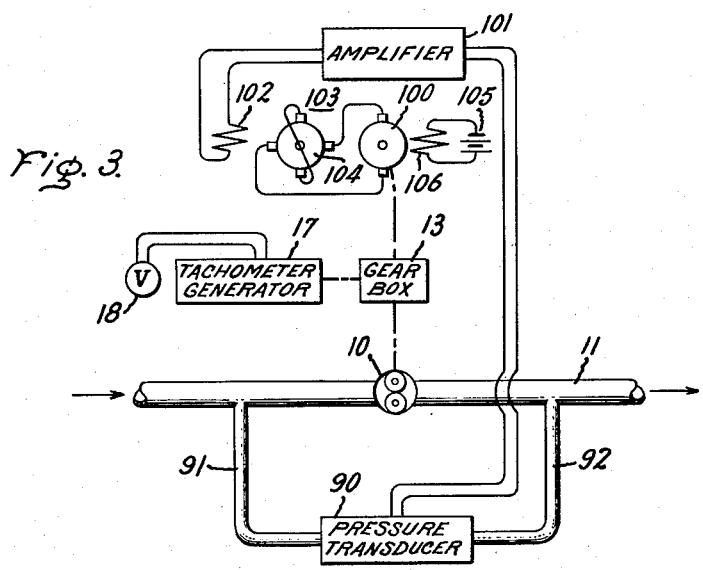
FIGURE 3 is a view similar to FIGURE 2 but illustrating still another embodiment of this invention.

In the FIGURE 3 embodiment an electric motor 100 is employed as the driving mechanism for the fixed displacement unit 10, and the motor 100 drives the gearbox 13 and the tachometer 17 which supplies the voltage indicator 18. A differential in pressure existing in the conduit 11 is detected by a pressure transducer 90 connected across the pump 10 by conduits 91 and 92 as in FIGURE 2, and the electrical output of the transducer supplies a control signal for an amplidyne type drive which in turn controls the motor 100. The amplidyne type drive is of a conventional arrangement comprising an amplifier 101 receiving the electrical signal from the pressure transducer 90 and supplying the field 102 of an amplidyne generator 103. The output from the amplidyne generator armature 104 supplies the armature of motor 100 which has a separate D.-C. excitation, e.g. from battery 105 for its field 106. Zero pressure differential across the fixed displacement device can be obtained in this embodiment by an integrating device incorporated in the amplifier. Such an integrating device is not shown but is well known in the art.

Still another alternative embodiment is shown in FIGURE 4 wherein the driving mechanism for the gearbox 13 and the fixed displacement pump 10 is a variable displacement hydraulic motor 110. The control means 15 for the motor 110 is the same as that shown in FIGURE 1 except that the fluid supply from the second stage valve 65a controls the fluid through conduits 111 and 112 to the piston and cylinder arrangements 113 and 114. Conduits 120 and 121 are connected respectively to pressure source supply and return conduits 51 and 50. The variable displacement hydraulic motor 110 includes structure described in co-pending application Serial No. 422,193 filed by Tord Dannevig, April 9, 1954, now abandoned, and assigned to the same assignee as the present application. Briefly, this operation is that constant fluid pressure is supplied to the inlet side of the pintle 122 through the conduit 121, and this constant pressure fluid is in turn directed to the cylinder block 123 and into the cylinders 124 to force ball pistons 125 radially outward and cause rotation of the cylinder block 123. The variable fluid pressure admitted through conduit 111 or 112 operates to vary the displacement of pistons 130 and 131 and thereby vary the position of the race 132 with respect to the ball pistons 125.

The operation of the FIGURE 2, FIGURE 3, and FIGURE 4 embodiments is similar to that described in connection with the FIGURE 1 embodiment in that a differential pressure existing across the fixed displacement pump 10 is utilized to generate a signal, either hydraulic or electric, which signal in turn is used to control the operation of a driving mechanism in the form of a hydraulic motor 12 or an electric motor 100.

It will be readily appreciated that, while hydraulic and electrical arrangements have been described, other types of control arrangements may be employed within the scope of this invention. For example, pneumatic systems and also mechanical systems may be used in a servo loop including the fixed displacement pump 12 for controlling its pumping operation to maintain the pressure differential across the pump at substantially zero.

While particular embodiments of the invention have been illustrated and described, modifications thereof will readily occur to those skilled in the art. It should be understood therefore that the invention is not limited to the particular arrangements disclosed but that the appended claims are intended to cover all modifications which do not depart from the true spirit and scope of the invention.

What is claimed as new and desired to be secured by United States Letters Patent is:

1. A fluid flow indicator comprising a fixed displacement device adapted to pass fluid in a conduit, a driving mechanism for said device including a hydraulic motor, hydraulic control means responsive to a differential pressure across said device for causing the driving mechanism to continuously tend to reduce the pressure differential to substantially zero, said control means including a two stage hydraulic servo mechanism, the second stage continuing to operate said driving mechanism when said pressure differential is substantially zero, and flow indicating means associated with the driving mechanism, the power for said driving mechanism and said control means being derived from a source independent of the fluid in said conduit.

2. A fluid flow indicator comprising a fixed displacement device adapted to pass fluid in a conduit, a driving mechanism for said device including a hydraulic ball piston motor, control means responsive to a differential pressure across said device for causing the driving mechanism to tend to reduce the pressure differential to substantially zero, said control means including a pair of interconnected opposed bellows connected to the conduit on opposite sides of said device, two-stage hydraulic valve means operable in response to movement of said bellows, a source of hydraulic fluid under pressure controlled and supplied to said hydraulic motor by said valve means, the second stage of said hydraulic valve means continuing to supply hydraulic fluid to said motor when the first stage of said hydraulic valve returns to its neutral position, and flow indicating means associated with the driving mechanism.

3. A fluid flowmeter for measuring flow through a conduit adapted to pass fluid under pressure and also adapted to operate reliably and accurately over a wide range of pressures, temperatures, densities, viscosities, and flow rates and with minimum extraction of power from the fluid being metered comprising a fixed displacement device in said conduit adapted to develop a pressure differential across it resulting from changes in flow through the conduit, a driving mechanism including a hydraulic motor for continuously driving the fixed displacement device at a speed and in a direction tending to maintain the pressure differential across the device at a value near zero, control means responsive to said differential pressure for controlling said driving mechanism, said control means including a two stage hydraulic servo mechanism, the second stage continuing to operate said driving mechanism when said pressure differential is substantially zero, and indicating means proportional to the rotation of said fixed displacement device for indicating flow through the flowmeter.

4. A fluid flowmeter for measuring flow through a conduit adapted to pass fluid under pressure and also adapted to operate reliably and accurately over a wide range of pressures, temperatures, densities, viscosities, and flow rates and with minimum extraction of power from the fluid being metered comprising a fixed displacement device in said conduit adapted to develop a pressure differential across it resulting from changes in flow through the conduit, a driving mechanism including a hydraulic ball piston motor for continuously driving the fixed displacement device at a speed and in a direction tending to maintain the pressure differential across the device at a value near zero, control means responsive to said differential pressure for controlling said driving mechanism, said control means including a pair of interconnected opposed bellows connected to the conduit on opposite sides of said device two-stage hydraulic valve means operable in response to movement of said bellows, a source of hydraulic fluid under pressure controlled and supplied to said hydraulic motor by said valve means, one stage of said hydraulic valve means continuing to supply hydraulic fluid to said motor when the other stage of said hydraulic valve means returns to its neutral position, and indicating means proportional to the rotation of said fixed displacement device for indicating flow through the flowmeter.

5. A fluid flow indicator comprising a fixed displacement device adapted to pass fluid in a conduit, a driving mechanism for said device, control means responsive to a differential pressure across said device for causing the driving mechanism to continuously tend to reduce the pressure differential to substantially zero, said control means comprising a pressure transducer connected to opposite sides of said fixed displacement device for providing an electric signal, a pair of interconnected opposed electromagnets responsive to said electric signal, valve means operatively connected to said electromagnets and controlled thereby, said valve means including a two stage hydraulic servo mechanism, the second stage continuing to operate said driving mechanism when said pressure differential is substantially zero, a source of hydraulic fluid under pressure controlled and supplied to said driving mechanism by said valve means, said hydraulic fluid being independent of the fluid in said conduit, and indicating means for indicating the rotation of said driving mechanism as a measure of fluid flow through said conduit.

6. A fluid flow indicator comprising a fixed displacement device adapted to pass fluid in a conduit, a driving mechanism for said device, control means responsive to a differential pressure across said device for causing the driving mechanism to continuously tend to reduce the pressure differential to substantially zero, said control means including a two stage hydraulic servo mechanism, the second stage continuing to operate said driving mechanism when said pressure differential is substantially zero, and flow indicating means associated with the driving mechanism for continuously indicating flow through the conduit, the power for said driving mechanism and said control means being derived from a source independent of the fluid in said conduit.

(References on following page)

References Cited in the file of this patent

UNITED STATES PATENTS

| | | |
|---|---|---|
| 1,325,434 | Carey et al. | Dec. 16, 1919 |
| 1,451,064 | Dunajeff | Apr. 10, 1923 |
| 2,080,183 | Pigott | May 11, 1937 |
| 2,118,079 | Goode | May 24, 1938 |
| 2,357,199 | Holst | Aug. 29, 1944 |
| 2,453,538 | Rauch | Nov. 9, 1948 |
| 2,588,342 | Bidwell | Mar. 11, 1952 |
| 2,621,516 | Zavoico | Dec. 16, 1952 |
| 2,646,755 | Joy | July 28, 1953 |
| 2,842,961 | Doll | July 15, 1958 |